Oct. 10, 1939.  P. E. MERCIER  2,175,535
COWLING FOR AIRCRAFT ENGINES OR RADIATORS
Filed April 6, 1938   5 Sheets-Sheet 1

INVENTOR:
PIERRE ERNEST MERCIER
BY Haseltine Lake & Co.
ATTORNEYS

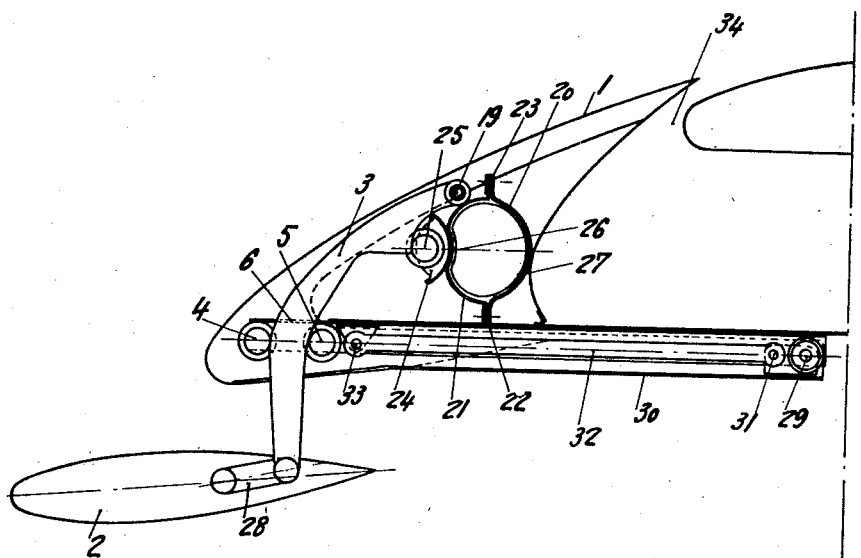
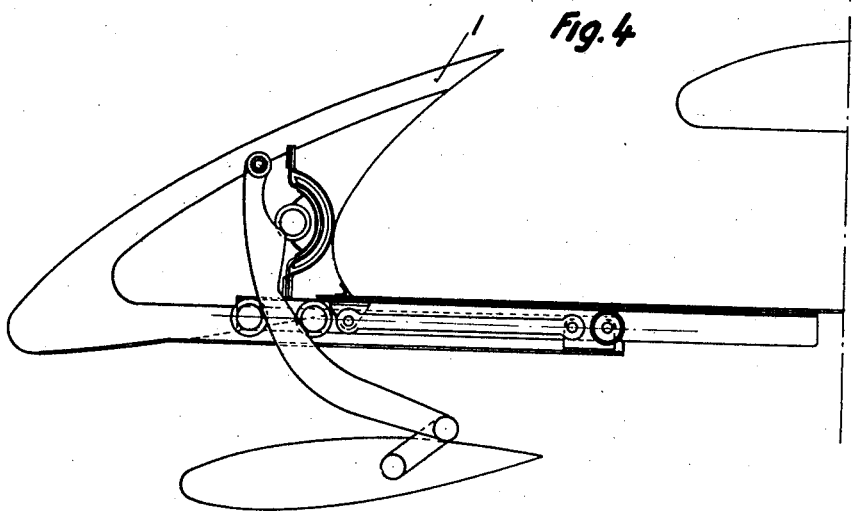

INVENTOR:
PIERRE ERNEST MERCIER
BY Haseltine, Lake & Co.
ATTORNEYS

Oct. 10, 1939.                    P. E. MERCIER                    2,175,535
                      COWLING FOR AIRCRAFT ENGINES OR RADIATORS
                        Filed April 6, 1938        5 Sheets-Sheet 4

INVENTOR:
PIERRE
ERNEST MERCIER
BY Haseltine Lake &Co.
   ATTORNEYS

Oct. 10, 1939.    P. E. MERCIER    2,175,535
COWLING FOR AIRCRAFT ENGINES OR RADIATORS
Filed April 6, 1938    5 Sheets-Sheet 5

INVENTOR:
PIERRE ERNEST MERCIER
BY Haseltine Lake & Co.
ATTORNEYS

Patented Oct. 10, 1939

2,175,535

UNITED STATES PATENT OFFICE 2,175,535

COWLING FOR AIRCRAFT ENGINES OR RADIATORS

Pierre Ernest Mercier, Paris, France

Application April 6, 1938, Serial No. 200,327
In France August 26, 1937

13 Claims. (Cl. 244—55)

This invention relates to cowlings for aircraft engines or radiators.

In the co-pending application Ser. No. 144,592 of May 25, 1937, there is described a cowling with branched cooling air circulation comprising inlet and outlet openings which are preferably simultaneously variable, and including conduits diverging in the direction of the air flow from the inlet opening, and converging in the direction of the airflow towards the outlet opening. According to one arrangement described in the said co-pending application, variation of the inlet and outlet openings is obtained by the use of multiple shutters or flaps coupled together by means of connecting rods.

According to the present invention, the control of the inlet and outlet openings is obtained by translational movement of annular elements, in the form of blades or vanes, in a direction parallel to the axis of the cowling.

One of the inlet or of the outlet openings of the branch may, in accordance with the invention, be constituted by two or more annular openings or slots concentric with each other, the effective cross-section of the annular openings being a function of the relative positions of annular blades or vanes.

According to one embodiment, the effective cross-sections of the openings vary simultaneously according to the rates of running. According to another embodiment, one or more of the openings or slots is or are non-variable, whilst others are opened or closed according to running conditions.

In the first case it is sufficient to control the movement of translation of one of the annular elements and to connect this element, by combinations of connecting rods and levers, to the others in order to obtain the necessary relative and simultaneous displacements.

In the second case it is possible to effect the variation of the inlet and of the outlet openings by the movement of translation of a single annular element.

In the accompanying drawings

Figure 1:
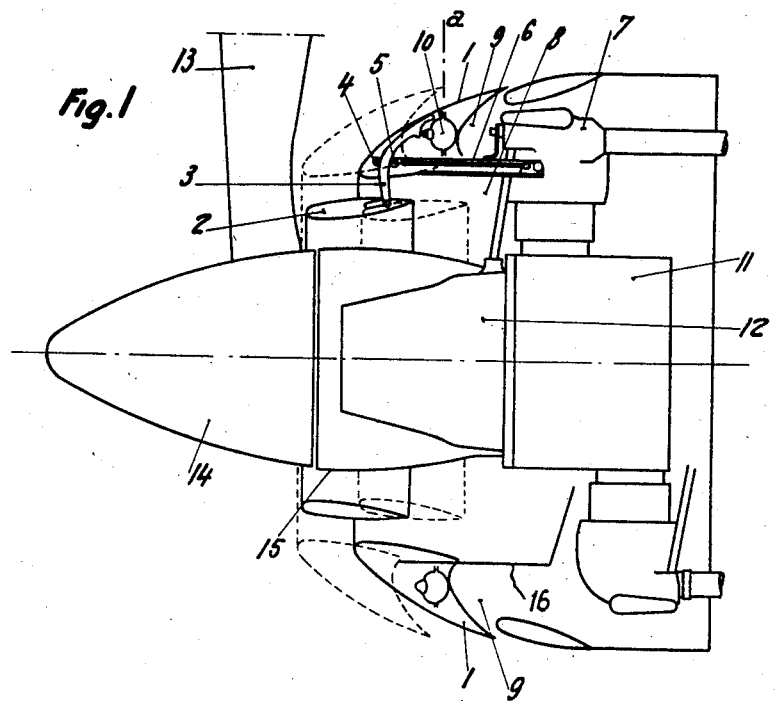
Figure 2:
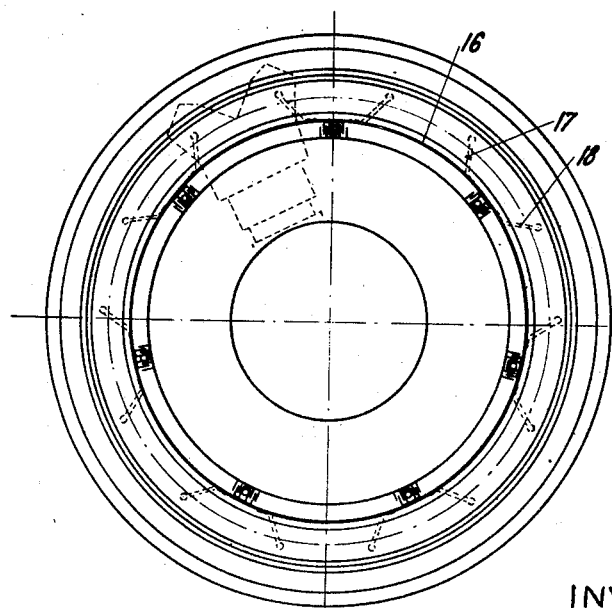
Figure 5:
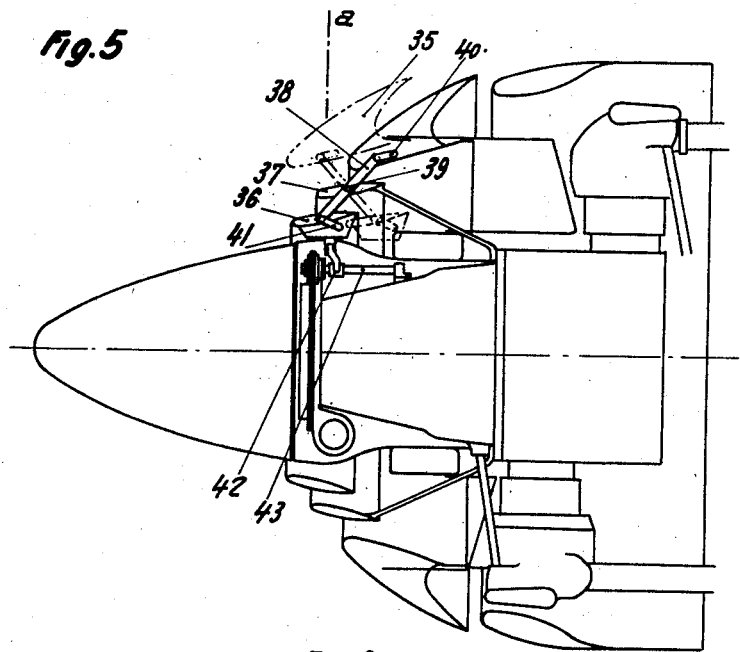
Figure 6:
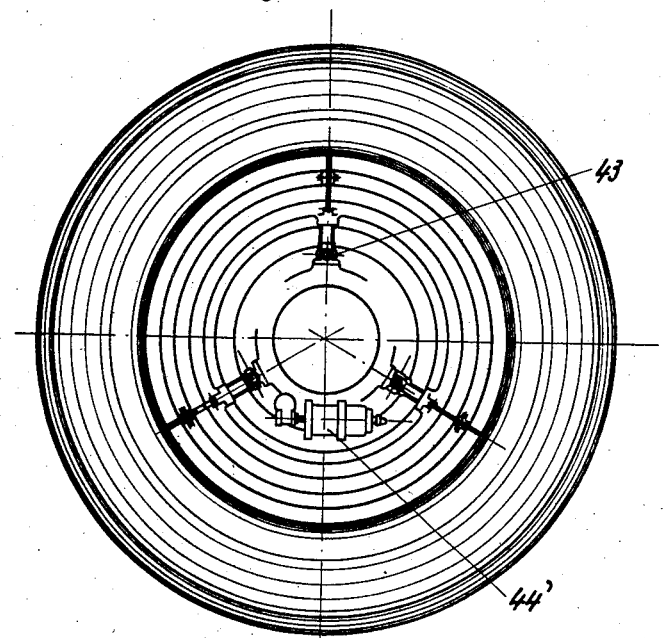

Figure 1 represents, in section, a control arrangement according to the invention as applied to a cowling with a return flow of the cooling air, Figure 2 shows, in elevation, the operating system for the blade-like elements, Figures 3 and 4 represent, on a larger scale and in radial section, the control mechanism and its connection, the axially movable element of larger diameter and the inner element whose axial displacement takes place in the direction opposite to that of the outer element, Figure 5 shows, in axial diagrammatic section, another example but with mechanical control of the blade-like elements by screws and nuts, as applied to a cowling with return flow of the cooling air, Figure 6 is the front elevation of the same arrangement.

Figure 7:
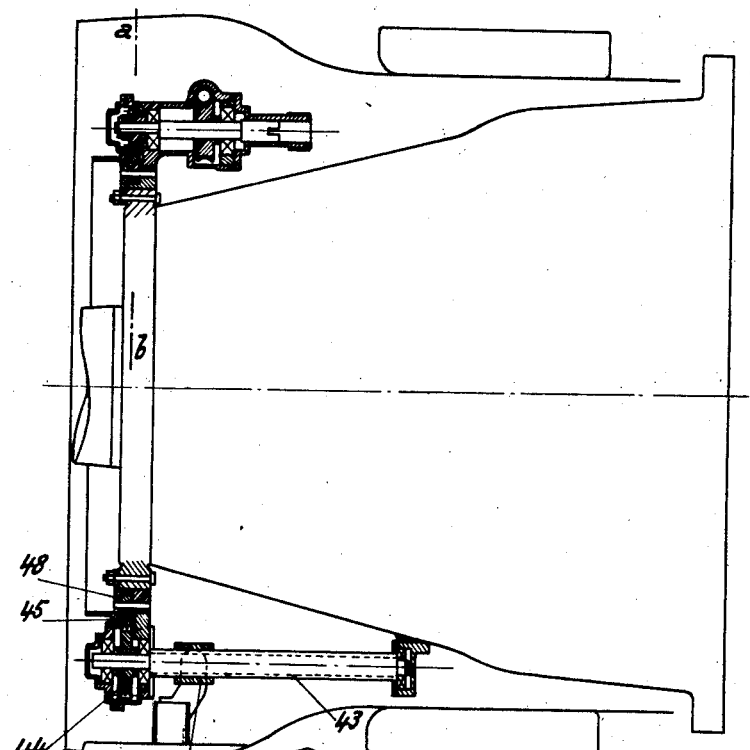
Figure 8:
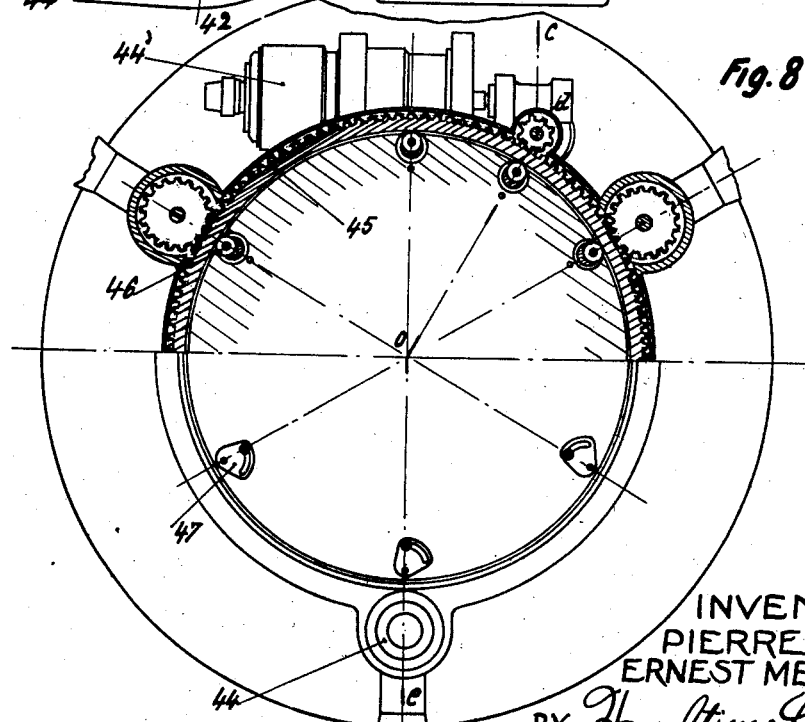
Figure 9:
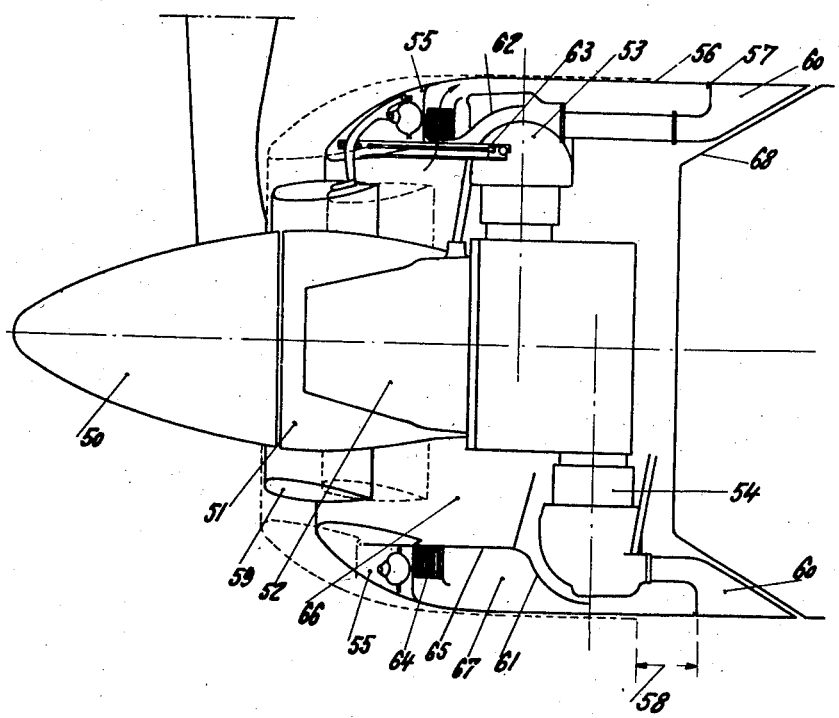

Figure 7 is an axial section, on a larger scale, showing the screw and nut system including the operating rim, Figure 8 represents a front elevation, partly in section, of the same system, and Figure 9 is an example of control mechanism of the first type as applied to a cowling with interior circulation from front to rear.

In the construction shown in Figures 1 and 2, the cowling is applied to a double star engine, of which one cylinder of the front star is shown above the axis and one cylinder of the rear star below the axis.

The movable blade-like element of larger diameter is shown at 1 whilst an inner blade-like element, which is moved axially in a direction opposite to that of the element 1, is shown at 2.

The relative movements of the annular blade-like elements 1 and 2 could of course be obtained by fixing the element 2 in position and moving the element 1 thus avoiding the necessity for interconnecting the elements 1 and 2. In the construction shown, however, the two elements 1 and 2 are interconnected as hereinafter described in detail through rocking levers one of which is shown at 3 and lies between two rollers 4 and 5 carried by a slide 6 which is rigidly connected to a fixed part, for example, one of the engine cylinders 7. The slides 6 are braced by a metal plate 16 which also prevents flow of cooling air from the inlet zone 8 under pressure to the outlet zone 9 under depression. An expansible chamber 10 acts on the levers 3.

The engine casing proper is indicated at 11 and the forward engine casing at 12, the propeller being indicated by one blade 13 thereof. The fairing of the propeller boss lies in alignment with a fairing part 15 fixed with respect to the engine casing. Figure 2 shows the metal plate 16 bracing the fixed slides 6, and members 17 and 18 which connect the system of slides 6 as also the metal plate 16 to the engine cylinders, of which one is shown dotted.

The arrangement above described is shown on a larger scale in Figures 3 and 4, which include the elements 1 and 2 and the adjacent parts, the lever 3 and the rollers 4 and 5 associated therewith, the lever 3 pivoted at 19 on the element 1.

The expansible chamber comprises a rigid semicircular wall 20, which co-operates with a semicircular wall 21 of cloth, leather or other flexible material, the two semi-circular walls being connected together as shown at 22 and 23.

A rigid segment 24 bears against the flexible wall 21 and carries rollers 25 which bear against a nose on the lever 3. To avoid displacement of the part 24 with respect to the wall 21 these two parts are connected together by rivets, eyelets or the like, preferably along the plane intersecting the figure at the point 26. The gas or liquid for the expansible chamber is contained in an envelope 27 which acts in the same way as the tube of a pneumatic tire.

The element 2 is connected to the lever 3 through a link 28 and the element 1 is centered with respect to the fixed slide 6 by a roller 29 carried by a rolled iron piece 30 integral with the element 1. The iron piece 30 carries a pivot pin 31 to which is connected a resilient tension member 32, the opposite end of which is attached at 33 to the fixed slide 6, the resilient tension member 32 being extended by forward movement of the lever 3.

In Figure 3 the element 1 is shown in its extreme position towards the right, that is to say, giving minimum cross-section for the cooling air outlet opening 34. In Figure 4 the element 1 is shown in its extreme forward position, i. e. with the maximum cross-section for the outlet opening 34. The element 1 is moved axially to this position by contraction of the resilient tension member 32 due to collapse of the expansible wall 21, whilst in Figure 3 the gas or liquid under pressure in the chamber 27 opposes the action of the resilient tension member 32 and thus maintains the tension member extended, thereby reducing the outlet opening 34 to a minimum. In other words, when the air is allowed to escape from the chamber 27, pressure in this chamber becomes lower than the tension of the resilient or elastic tension member 32 that is attached at the left to a fixed point and at the right to a movable point. Said movable point therefore begins to place itself to the left, and with it the whole aggregate 30—1—27. The point of articulation 19 is thus displaced to the left, and as the rollers 4 and 5 remain in a fixed position, the lever 3 is obliged to oscillate and to occupy the position shown in Fig. 4. During this motion the lever bears on the movable roller 25, which it shifts to the right with relation to point 19. As the roller 25 is applied against the outer wall 21 of chamber 27, said chamber is compressed outwardly and is deflated and folds up in the position shown in Fig. 4. Inversely, when said chamber is inflated in the position shown in Fig. 4 it displaces the roller 25 to the left, which pushes the lever 3 and causes its angle to vary with relation to the member 1. The position of the rollers 4 and 5 being fixed, the whole aggregate 1—27—30 must return to the right, which stretches the elastic element 32 still more up to equilibrium with the pressure in chamber 27.

The construction shown in Figure 5 comprises an annular element of larger diameter 35, an inner annular element 36, the two elements 35, 36 being axially movable in opposite directions and an intermediate fixed blade-like element 37.

The elements 35 and 36 are interconnected through rocking levers, one of which is shown at 38, each rocking lever being fulcrumed at the center of its length 39 on the fixed intermediate element 37.

The ends of each lever 38 are connected to the elements 35 and 36 through links 40 and 41. The element 35 is operated by the levers 38 each of which is constrained by the link 41 to partake in the movements of translation of the inner annular element 36 which is moved axially by a system of screws and nuts, one of the nuts being shown at 42 and the corresponding screw at 43. From Figure 6 is will be seen that there are three screws 43 spaced 120° apart, an electric motor 44' operating the screws through an annular toothed rim. Figures 7 and 8 show, on a larger scale and in more detail the system of screws 43 and their nuts 42, actuated by the gearing 44, which is in turn operated by the annular toothed rim 45.

The rim 45 is centered by rollers 46, the supports 47 of which are carried by the general casing of the device indicated at 48 in Figure 7. The supports 47 are mounted on this casing eccentrically with respect to the axis of the rollers 46 so that rotation of the supports 47 with respect to the casing 48 moves the rollers 46 toward or away from the rim 45. The motor and the intermediate reducing gear connecting the latter to the ring 45 are shown on a larger scale at 44' in Figure 8. In the construction shown in Figure 9 cooling air escapes through an adjustable outlet opening or slot behind the engine cylinders and is controlled by the axial displacement of an annular element of larger diameter which is integral with a part of the exterior envelope of the cowling or fairing.

To show the multiple combinations to which the application of the invention to such a cowling may give rise, there is shown on Figure 9 one arrangement of an oil radiator combined with a normal flow of the cooling air around the cylinders from front to rear.

Naturally this is a particular arrangement which is optional and the invention could be combined with any one of the actuating mechanisms for deflectors ensuring a circulation by two or more sheets or flat streams of air, for example, as described in the co-pending U. S. patent application Ser. No. 169,400 filed Oct. 16, 1937.

It is also clear that the adjustable outlet slot shown in Figure 9 and actuated by the movement of translation of the annular element, could be of the multiple vane type without departing from the scope of the invention.

In the embodiment according to Figure 9, the central fairing is, as in the previous embodiments, constituted by a propeller hub boss 50 extended by a fixed fairing 51 surrounding the front casing 52 of the engine, of which one cylinder of the front star is shown at 53 whilst a cylinder of the rear star is shown by 54. The annular element of larger diameter 55 comprises a cylindrical sleeve 56 which controls an outlet opening 57 which is entirely closed when the element 55 occupies its rearmost position, the opening 57 attaining the width indicated at 58 when the element 55 accupies its forward position shown dotted.

The positions occupied by the inner blade-like element 59 are also shown in full lines and in broken lines. The forward position of the element 59 corresponds to the rear position of the element 55 and vice-versa. The exhaust outlet for the engine gases is shown diagrammatically at 60.

In order to simplify the figure, the complete system of deflectors has been omitted, only the deflectors of the cylinder heads being shown diagrammatically at 61 and 62. The figure shows the section of the cylinders 53 and 54 on their symmetrical plane, so that the system indicated at 63, for transmitting movement to the elements 55 and 59 does not correspond in position to the section through the diametrical line of the cylinder and are actually shifted in front of or behind the latter. The space between the element 55 and the heads of the cylinders 53 of the first star may be utilised as desired. For example, in the construction shown oil radiator elements 64 are arranged in alignment with an opening provided in the metal partition 65 separating the zone 66 under pressure of the incoming air from the zone 67 in depression which leads to the cooling air outlet opening 57. A fireproof plate 68 insulates the engine compartment.

It will be understood that the constructions above described are given by way of example only and that details may be modified, more particularly with respect to the number of control elements used, their profile and the means for guiding and effecting displacement and control.

What I claim is:

1. In a cowling for parts of aircraft requiring cooling, in combination, a conduit through which cooling air flows from an inlet opening to an outlet opening in the cowling, the said parts to be cooled being disposed in the said conduit, at least one annular blade-like element disposed in said inlet opening so as to divide the same into at least two concentric annular sections, means for varying the inlet opening comprising means for axially displacing the said annular element, means for varying the outlet opening, and means for associating the variations of the inlet and outlet openings.

2. In a cowling for parts of aircraft requiring cooling, in combination, a conduit through which cooling air flows from an air inlet opening to an air outlet opening in the cowling, the said parts to be cooled being disposed in the said conduit, at least one annular blade-like element for varying the inlet opening comprising, means for axially displacing the said annular element disposed in said inlet opening so as to divide the same into at least two concentric annular sections, means whose profile causes the part of the circulation conduit adjacent the inlet opening to have the form of a diverging nozzle when the said inlet opening is reduced to a minimum, means for varying the outlet opening, and means for associating the variations of the inlet and outlet openings.

3. In a cowling for parts of aircraft requiring cooling, in combination, a conduit through which cooling air flows from an inlet opening to an outlet opening in the cowling, the said parts to be cooled being disposed in the said conduit, a plurality of blade-like annular elements for varying the inlet opening, at least one of the said annular elements being fixed whilst at least one is axially movable, means for axially displacing each movable element, means for varying the outlet opening, and means for associating the variations of the outlet and inlet openings.

4. In a cowling for parts of aircraft requiring cooling, in combination, a conduit through which cooling air flows from an inlet opening to an outlet opening in the cowling, the said parts to be cooled being disposed in the said conduit, a plurality of annular blade-like elements for varying the inlet opening, at least one of the annular elements being fixed whilst at least two are axially movable, means for axially displacing the movable annular elements, means whereby the axial displacement of the movable elements takes place in opposite directions, means for varying the outlet opening, and means for associating the variations of the inlet and outlet openings.

5. In a cowling for parts of aircraft requiring cooling, in combination, a conduit through which cooling air flows from an inlet opening to an outlet opening in the cowling, the said parts to be cooled being disposed in the said conduit, a plurality of annular blade-like elements for varying the inlet opening, at least one of the annular elements being fixed and at least two axially movable, the movable elements being disposed on opposite sides respectively of the fixed element, means for axially displacing the movable annular elements, means whereby the displacements of the movable annular elements are opposite in direction, means for varying the outlet opening, and means for associating the variations of the inlet and outlet openings.

6. In a cowling for parts of aircraft requiring cooling in combination, a conduit through which cooling air flows from an inlet opening to an outlet opening in the cowling, the said parts to be cooled being disposed in the said conduit, at least one fixed annular blade-like element for varying the inlet opening and disposed near the centre of the cowling and constituting the outer wall of a fixed slot, at least one axially movable annular blade-like element radially spaced from the fixed annular element and constituting the outer wall of a variable slot whose inner wall is constituted by the fixed element, means for axially displacing the movable annular element, means for varying the outlet opening, and means for associating the variations of the inlet and outlet openings.

7. In a cowling for parts of aircraft requiring cooling, in combination, a conduit through which cooling air flows from an inlet opening to an outlet opening in the cowling, the said parts to be cooled being disposed in this conduit, at least one annular blade-like element disposed in said inlet opening so as to divide the same into at least two concentric annular sections, means for varying the inlet opening, means for axially displacing this annular element, means for varying the outlet opening, means for associating the variations of the inlet and outlet openings, and screw and nut mechanism for controlling the axial displacements of the movable elements.

8. In a cowling for parts of aircraft requiring cooling, in combination, a conduit through which cooling air flows from an inlet opening to an outlet opening in the cowling, the said parts to be cooled being disposed in the said conduit, at least one annular blade-like element disposed in said inlet opening so as to divide the same into at least two concentric annular sections, means for varying the said inlet opening, means for axially displacing this element, means for varying the outlet opening, means for associating the variations of the inlet and outlet openings, and means for controlling the said axial displacements comprising a chamber having flexible walls which bears against a member connected to the axially movable element, and means for varying the effective volume of the said chamber.

9. In a cowling for parts of aircraft requiring cooling, in combination, a conduit through which cooling air flows from an inlet opening to an outlet opening in the cowling, the said parts to be cooled being disposed in the said conduit, at least one annular blade-like element disposed in said inlet opening so as to divide the same into at least two concentric annular sections, means for varying the inlet opening, means for axially displacing this element, and means whereby the outlet opening is controlled by the axial displacement of the said movable annular element.

10. In a cowling for parts of aircraft requiring cooling, in combination, a conduit through which cooling air flows from an inlet opening to an outlet opening in the cowling, the said parts to be cooled being disposed in the said conduit, means for simultaneously varying the inlet and outlet openings comprising an annular blade-like element disposed in said inlet opening so as to divide the same into two concentric annular sections, a cowling part, the profile of which limits on the one hand the part of the said conduit adjacent the exterior annular section of the inlet opening and on the other hand the part of the said conduit adjacent the outlet opening and means for axially displacing this cowling part.

11. In a cowling for parts of aircraft requiring cooling, in combination, a conduit through which cooling air flows from an inlet opening to an outlet opening in the cowling, the said parts to be cooled being disposed in the said conduit, means for simultaneously varying the inlet and outlet openings comprising an annular blade-like element disposed in said inlet opening so as to divide the same into two concentric annular sections, a cowling part, the profile of which limits the part of the said conduit adjacent the inlet opening, a sleeve, means connecting the sleeve to the said annular element, the profile of the sleeve limiting the part of the conduit adjacent the outlet opening, and means for axially displacing the whole of the said cowling part and sleeve.

12. In a cowling for parts of aircraft requiring cooling, in combination, a conduit through which cooling air flows from an inlet opening to an outlet opening in the cowling, the said parts to be cooled being disposed in the said conduit, means for varying the inlet opening comprising a plurality of annular blade-like elements of which at least one is fixed and at least two are axially movable, means for axially displacing the movable elements, levers disposed in radial planes of the cowling and mounted to pivot about one of their intermediate points bearing against a fixed element connected to the cowling, their extreme points bearing against the movable elements, means for varying the outlet opening, and means for associating the variations of the inlet and outlet openings.

13. In a cowling for parts of aircraft requiring cooling, in combination, a conduit through which cooling air flows from an inlet opening to an outlet opening in the cowling, the said parts to be cooled being disposed in the said conduit, at least one annular blade-like element disposed in said inlet opening so as to divide the same into at least two concentric annular sections, means for varying the inlet opening, means for axially displacing this element, means for varying the outlet opening, means for associating the variations of the inlet and outlet openings, and means for controlling the axial displacements of the movable elements, the latter means comprising nut and screw mechanism, a toothed annulus engaging this mechanism and centred on the cowling, and a motor in driving connection with the said toothed annulus.

PIERRE ERNEST MERCIER.